US012646995B2

(12) United States Patent
Blaser et al.

(10) Patent No.: US 12,646,995 B2
(45) Date of Patent: Jun. 2, 2026

(54) ROTOR FOR A HIGH-SPEED ELECTRICAL MACHINE

(71) Applicant: Celeroton AG, Volketswil (CH)

(72) Inventors: Manuel Blaser, Volketswil (CH); Andreas Looser, Volketswil (CH); Fabian Dietmann, Volketswil (CH)

(73) Assignee: CELEROTON AG, Volketswil (CH)

( * ) Notice: Subject to any disclaimer, the term of this patent is extended or adjusted under 35 U.S.C. 154(b) by 228 days.

(21) Appl. No.: 18/574,856

(22) PCT Filed: Jul. 6, 2022

(86) PCT No.: PCT/EP2022/068663
§ 371 (c)(1),
(2) Date: Dec. 28, 2023

(87) PCT Pub. No.: WO2023/280893
PCT Pub. Date: Jan. 12, 2023

(65) Prior Publication Data
US 2024/0297551 A1     Sep. 5, 2024

(30) Foreign Application Priority Data
Jul. 7, 2021     (EP) ..................................... 21184165

(51) Int. Cl.
*H02K 7/08*          (2006.01)
*H02K 1/27*          (2022.01)
(52) U.S. Cl.
CPC ............... *H02K 7/088* (2013.01); *H02K 1/27* (2013.01)
(58) Field of Classification Search
CPC .. H02K 1/00; H02K 1/27; H02K 7/00; H02K 7/088; H02K 7/086; H02K 1/22; H02K 7/003; H02K 2213/03; H02K 1/02
See application file for complete search history.

(56) References Cited

U.S. PATENT DOCUMENTS 4,063,850 A     12/1977   Hueber et al.
4,585,396 A      4/1986   Kawamura et al.
(Continued)

FOREIGN PATENT DOCUMENTS

CN          104485772 A  *  4/2015  ............. H02K 15/00
EP            1009086 A1  *  6/2000  ............ F16C 33/303
(Continued)

OTHER PUBLICATIONS

Machine Translation of CN 104485772 A (Year: 2015).*
(Continued)

*Primary Examiner* — Alexander A Singh
*Assistant Examiner* — Charlie Frank Mann, Jr.
(74) *Attorney, Agent, or Firm* — Rankin, Hill & Clark LLP

(57)          ABSTRACT

A rotor for a high-speed electrical machine with gas bearings includes at least one rotor side radial bearing, a rotor side axial bearing, a rotor body section including the at least one rotor side radial bearing, and a rotor end section including the rotor side axial bearing. When seen along the rotor's axis of rotation, a radial bearing section is defined as a section along which a radial bearing extends. Therein, an outer rotor part extends along the rotor end section and the rotor body section. The outer rotor part is shaped to form, in the rotor body section, a hollow cylinder or bearing sleeve. At least one rotor plug is arranged inside the bearing sleeve, and the material of the at least one rotor plug has a CTE lower than 7E-6 K^-1.

18 Claims, 3 Drawing Sheets

(56) References Cited

U.S. PATENT DOCUMENTS

| | | | |
|---|---|---|---|
| 4,639,194 A | | 1/1987 | Bell, III et al. |
| 4,854,025 A | | 8/1989 | Oda et al. |
| 6,815,855 B2 * | | 11/2004 | Yashiro .................. H02K 7/088 |
| | | | 310/90 |
| 10,794,390 B2 | | 10/2020 | Bonnefoi et al. |
| 2004/0051416 A1 * | | 3/2004 | Yamada ................ F04D 29/053 |
| | | | 310/156.28 |

FOREIGN PATENT DOCUMENTS

| | | | | |
|---|---|---|---|---|
| EP | 2 314 878 A1 | 4/2011 | | |
| EP | 2637288 A2 * | 9/2013 | ........... | H02K 1/2733 |
| GB | 962277 A | 7/1964 | | |
| WO | 2014/175766 A1 | 10/2014 | | |
| WO | 2017/200828 A1 | 11/2017 | | |
| WO | 2017/202941 A1 | 11/2017 | | |
| WO | 2020/002509 A1 | 1/2020 | | |

OTHER PUBLICATIONS

Text Version of EP 1009086 A1 (Year: 2000).*
National Center for Biotechnology Information (2025). PubChem
Compound Summary for CID 9863, Silicon carbide. Retrieved Oct.
1, 2025 from https://pubchem.ncbi.nlm.nih.gov/compound/Silicon-
carbide. (Year: 2005).*
Text Version of EP 2637288 A2 (Year: 2013).*
International Search Report dated Oct. 20, 2022, Application No.
PCT/EP2022/068663; 2 pages.

* cited by examiner

ROTOR FOR A HIGH-SPEED ELECTRICAL MACHINE

BACKGROUND OF THE INVENTION

Field of the Invention

The invention relates to the field of electrical machines. It relates to a rotor for a high-speed electrical machine with gas bearings.

Description of Related Art

An electric motor generally includes a rotor and a stator, the stator including a stator body supporting and housing an electrical stator and bearings. The bearings include one or more radial (also called journal) and axial (also called thrust) bearings being gas bearings. Often, two radial bearings are present. They can be located at opposite sides of the stator, that is with electromagnetic elements driving the rotor being arranged in between the two radial bearings, or on the same side of the stator. The latter arrangement is often called overhanging motor design. With the overhanging design, the two radial bearings can be integrated into a single part. However, this approach generally results in longer rotors and therefore more critical rotordynamic behaviour of the rotor and increased manufacturing effort of the rotor. This leads to conflicting requirements caused by the desire to keep the rotor short, to simplify manufacturing effort and thus cost, and to raise performance limits caused, for example, by the rotordynamic behaviour.

Often, manufacturing tolerances and material requirements are different for the rotor radial bearing and the rotor axial bearing, making it challenging to find a rotor construction that is simple to manufacture, with a low number of different pieces, materials and interfaces.

WO 2018/041938 A1 discloses a turbo compressor shaft with radial and axial air bearings. A shaft for carrying an impeller and an axial bearing plate is inserted in one end of a tubular bearing portion, and driving portion for carrying elements of an electrical motor is inserted in the other end. The tubular bearing portion is made of a hard material, and the impeller portion and/or the driving portion are made of relatively soft material compared to the hard material of the tubular bearing portion.

U.S. Pat. No. 4,063,850 A discloses a gas turbine rotor with a ceramic turbine wheel and a rotor shaft formed in part of ceramic material, the wheel and part of the rotor being formed as one piece. A ceramic shaft portion of the rotor extends into a cooler zone of the engine where it is connected to a steel shaft portion containing a supporting tube and bridging the two shaft portions. The ceramic shaft portion is supported by a radial air bearing. A ceramic axial bearing disk is formed as one piece with the ceramic shaft portion.

U.S. Pat. Nos. 4,585,396A, 4,854,025A and 4,639,194A disclose ceramic turbine wheels or impellers connected to steel rotor shafts.

WO 2014/175766 A1 and WO 2017/200828 A1 disclose a rotor shaft with a hollow cross-section and with a heat conducting element for distributing heat arranged in the hollow cross-section. The heat conducting element is made of a material that has a higher thermal conductivity than the material of the rotor shaft.

GB 962277 A discloses a similar arrangement, with cooling ribs on the inside of the heat conducting element.

WO2017202941 and WO2020002509 disclose rotors with air bearings where the radial and axial bearing is made out of one piece and material.

US 2004/0051416 A1 shows a rotor with a reinforcement sleeve fitted around the circumference of a permanent magnet, and on one side of the magnet around a turbine shaft and at the other side around a bearing member. The reinforcement sleeve does not include any bearing sections.

All of the rotors in prior art are challenging to manufacture and/or do not allow to use optimal materials for the different parts and functions of the rotor.

SUMMARY OF THE INVENTION

It is therefore an object of the invention to create a rotor for a high-speed electrical machine with gas bearings, which offers improvements over the prior art.

These objects are achieved by a rotor for a high-speed electrical machine with gas bearings.

The rotor is for a high-speed electrical machine with gas bearings, the rotor including:

- at least one rotor side radial bearing,
- a rotor side axial bearing,
- a rotor body section including the at least one rotor side radial bearing,
- a rotor end section including the rotor side axial bearing,
- wherein, when seen along the rotor's axis of rotation, a radial bearing section is defined as a section along which a radial bearing extends.

Therein, an outer rotor part extends along the rotor end section and the rotor body section,

- the outer rotor part is shaped to form, in the rotor body section, a hollow cylinder serving as bearing sleeve,
- at least one rotor plug is arranged inside the bearing sleeve, and the material of the at least one rotor plug has a coefficient of thermal expansion (CTE) lower than 7E-6 K^-1,
- in particular lower than 5E-6 K^-1 even more in particular lower than 4E-6 K^-1.

This allows to have a CTE of the rotor, in particular in a radial direction, to be dominated by the CTE of the rotor plug, which is comparatively low.

In embodiments, the rotor plug, when seen along the rotor's axis of rotation, does not extend to an axial bearing section.

In embodiments, the rotor plug is a separate part and not combined with a rotor end piece.

In embodiments, the rotor plug does not contain any permanent magnetic material.

In embodiments, the rotor plug is intentionally made to deform the bearing sleeve when assembling the rotor plug into the bearing sleeve, more specifically to apply pre-tension to the bearing sleeve. This is in contrary to prior art, where the rotor plug is made out of soft material (meaning a material with low resistance to elastic or plastic deformation), which is used with the goal to not deform the bearing sleeve.

In embodiments, the outer rotor part material is a metal or a metal-type material, in particular a steel.

In embodiments, the material of the outer rotor part has a Rockwell hardness larger than 40 HRC, in particular larger than 50 HRC, even more in particular larger than 55 HRC.

In embodiments, the material of the at least one rotor plug has a density lower than 4500 kg/m^3, in particular lower than 3500 kg/m^3.

In embodiments, the material of the at least one rotor plug has a CTE lower than $7E-6$ $K^-1$, in particular lower than $5E-6$ $K^-1$ even more in particular lower than $4E-6$ $K^-1$.

In embodiments, a first set of material features is present, including the features that the material of the at least one rotor plug has a CTE lower than $7E-6$ $K^-1$, in particular lower than $5E-6$ $K^-1$ even more in particular lower than $4E-6$ $K^-1$, and the outer rotor part material is a metal or a metal-type material, in particular a steel.

In embodiments, a second set of material features is present, which includes the first set of material features and further includes the feature that the material of the outer rotor part has a Rockwell hardness larger than 40 HRC, in particular larger than 50 HRC, even more in particular larger than 55 HRC.

In embodiments, a third set of material features is present, which includes the second set of material features and further includes the feature that the material of the at least one rotor plug has a density lower than 4500 kg/m^3, in particular lower than 3500 kg/m^3.

In embodiments, fourth set of material features is present, which includes the third set of material features and further includes the feature that the material of the at least one rotor plug has a ratio of Young's modulus to density of larger than 250 GPa/3100 kg/m^3, in particular larger than 350 GPa/3100 kg/m^3.

According to embodiments, an order of priorities of the abovementioned material properties defining the rotor plug and outer rotor part is:

first priority: CTE of the rotor plug;
second priority: material of the outer rotor part;
third priority: Rockwell Hardness of the outer rotor part;
fourth priority: density of the rotor plug;
fifth priority: Ratio of Young's modulus to density of the rotor plug.
sixth priority: Ratio of tensile strength to density of the outer rotor part.

As a result, it becomes possible to realise one or more of the following advantages:

Having a first material type, e.g., ceramics, for the rotor plugs allows to have a simple process for manufacturing the parts of the first type material parts, since the rotor plug or plugs can be simple circular cylinders.

Having a second type material, e.g., high performance steel, for the bearing sleeve makes it easier to machine than a first type material. This is particularly advantageous when it is integrally shaped with the rotor stub shaft.

Having a bearing sleeve of the second type material, which means that it has a comparatively high CTE, in the radial bearing sections is, in principle, a disadvantage, since it heats up during operation. However, with a plug of the first type material pressed in the rotor sleeve of the second type material, the CTE of this combination can be lowered to be close to the CTE of the plug.

Similarly to expansion under temperature, with a press-fit of plugs with a relatively high ratio of e-modulus to density and the sleeve with a potentially lower ratio of e-modulus to density, the expansion of this combination due to centrifugal forces at high rotational speeds is lowered towards the expansion of the plug. With increasing speed, the press fit, which creates a pre-tension within the bearing sleeve, first is partially loosened, becoming less tight, before the bearing sleeve begins to expand. The sleeve's expansion corresponds more to the expansion of a solid than a hollow cylinder, and more to the plug material parameters than the sleeve material parameters. In embodiments, the thickness of the sleeve is less than or equal to 20% of the radius of the plug. That is, the outer radius of the sleeve is less than 120% of the radius of the plug.

The axial bearing plate, being part of the outer rotor part, can be made of the second type material. It thus can have a higher strength than the parts of the first type material, which is an advantage in the axial bearing plate since, having the largest diameter, it is subject to the highest centrifugal forces.

The outer rotor part in the rotor end section can form a rotor stub shaft. The rotor stub shaft and the bearing sleeve can be made of the same material as separate pieces and then joined, or they can be integrally shaped, that is, as a single piece. The rotor plugs can be solid or hollow cylinders.

In embodiments, the high-speed electrical machine that the rotor is designed to be used in is a turbo compressor, in which case it can drive an impeller attached to the rotor end piece. In other embodiments, the high-speed electrical machine drives a beam chopper or a rotating prism or mirror or any other load. In other embodiments, the high-speed electrical machine is driven by a turbine, in combination with a turbo compressor impeller or not.

According to another aspect, the rotor is not driven by or part of an electrical machine.

Gas bearings are also called gas lubricated bearings, or fluid film bearings with gaseous fluids. Gas bearings include air bearings.

In embodiments, the rotor plugs are made of a material that expands, at least approximately, as little as possible under a) rotation and b) temperature, as both high-speed rotation and elevated temperatures are present in high-speed rotors. Expansion ideally should be minimal in order to maintain the small gas bearing clearance between the rotor and a stator's bearing bushing. Furthermore, the rotor plugs should be lightweight and stiff in order to increase bearing performance (i.e. increase the maximum stable rotational speed).

Although it would be preferable for the rotor plugs to be easy to machine, in a trade-off with the abovementioned properties a reduced machinability can be tolerated. This can be mitigated by keeping the shape of the rotor plugs simple, allowing for easier manufacturing than for the outer rotor part.

In embodiments, the outer rotor part is made of a material that has high tensile strength, in particular when compared to the rotor plugs, and a high ratio of tensile strength to density, as this allows for a comparatively higher circumferential speed and therefore a larger axial bearing outer diameter for a given rotational speed. A larger axial bearing diameter allows for a larger maximum axial load, which in turn is beneficial for withstanding vibrations and for axial thrust resulting from, for example, an impeller mounted onto the rotor. Furthermore, for the outer rotor part, which has a shape that is more complex than that of the rotor plugs, a material can be used that is easier to machine than the material for the rotor plugs, reducing the cost for machining. Furthermore, the material of the outer rotor part ideally should be hard, in order to minimize wear at start-stop of the gas bearing, where there is dry friction between the rotor and the stator bearing.

Although it would be preferable for the outer rotor part to exhibit low expansion under a) rotation and b) temperature, in a trade-off with the abovementioned properties a higher expansion can be tolerated at this expansion is mitigated by the rotor plugs.

As a result, the material for the outer rotor part and the rotor plug are different. This allows to satisfy the different requirements for:

the outer rotor part, in particular for the axial bearing's strength and the simple machining of the outer rotor's more complex form and tolerances, and the rotor plugs, in particular for the radial bearing's low expansion under temperature and rotation, by separating the rotor into two parts that can be manufactured out of two different materials.

Expansion in the radial bearing can be limited by combining, in the radial direction, a thin bearing sleeve, for which material a higher expansion can be tolerated, with a thick rotor plug having a lower expansion, by a press fit. The press fit results in a low expansion overall, as the expansion is mainly defined by the rotor plug and not the bearing sleeve. The axial bearing and/or the rotor stub shaft can be made as separate parts of the same material as the bearing sleeve, or be integrally shaped with the bearing sleeve, making them easier to machine than the material of the rotor plug.

In embodiments, there is no press fit between rotor plug and the bearing sleeve, but the rotor plug and bearing sleeve are rigidly connected by another means (welding, gluing, soldering, other) resulting in the rotor plug restricting the bearing sleeve from expansion due to temperature or centrifugal forces, potentially without pre-tension.

Whereas in the prior art in which a combination of different materials is present, the material with a high coefficient of thermal expansion (CTE) is arranged to be on the inside, and the material with a low CTE on the outside, according to the present invention the opposite configuration can be realised.

In summary, a first type of material, which can also be called ceramic-type material, is used for the rotor plug. In embodiments, the first type material has one or more of the following properties:

low CTE: lower than 7E-6 K^-1, or 5E-6 K^-1 or 4E-6 K^-1.

low density (independent of e-modulus): lower than 4500 kg/m^3 or lower than 3500 kg/m^3.

high ratio of e-modulus to density: higher than 250 GPa/3100 kg/m^3 or 350 GPa/3100 kg/m^3.

Typical materials of the first type are: Ceramic materials, more specifically SiN, SiC, AlO. Further alternatives are: iron-nickel alloys (such as Invar), glass-ceramics, tungsten carbide, carbide metals.

In summary, a second type of material, which can also be called metal-type material, is used for the outer rotor part 28. In embodiments, the second type material has a good machinability and has one or more of the following properties:

high hardness (Rockwell hardness): higher than 40 HRC or 50 HRC or 55 HRC;

high ratio of strength to density: higher than 700 MPa/ 7700 kg/m^3 or 1500 MPa/7700 kg/m^3 or 2000 MPa/ 7700 kg/m^3

Typical materials are: Metals, more specifically steels, more specifically high-strength and hard steels, in particular EN 10027-2 steel number 1.4108, 1.4125, 1.4112

In embodiments, in at least one, and in particular all, of one or more radial bearing sections a rotor plug extends along most, in particular all, of the radial bearing section.

This allows the rotor plug to define and stabilise the diameter of the rotor body in the radial bearing sections. A rotor plug extending along most of the radial bearing section means that it extends along at least 90%, in particular at least 100% or 105% of the length of the radial bearing section.

In embodiments, in at least one, and in particular all, of one or more radial bearing sections a rotor plug extends, seen along the axial direction, only along the radial bearing section and not further, or only 30% or 40% further in relation to the length of the radial bearing section.

There can be a single rotor plug extending along two and more radial bearing sections, or there can be separate rotor plugs, typically separated by gaps, each extending along a corresponding radial bearing section. A rotor plug made of separate plug elements, typically having the same radius, that are arranged against or very close to one another (seen along the axial direction) can be functionally the same as a single rotor plug and therefore can be considered to be a single rotor plug.

In embodiments, the rotor includes a first and a second rotor side radial bearing, corresponding, respectively, to a first and a second radial bearing section, and wherein a first and second rotor plug are arranged, respectively, to extend along the first and second radial bearing section.

This allows for a relatively lightweight construction. Creating a press fit can be simplified because the first and second rotor plug can be assembled one after the other and are shorter than a single plug would be.

In embodiments, the rotor includes a first and a second rotor side radial bearing, corresponding, respectively, to a first and a second radial bearing section, and wherein a single rotor plug is arranged to extend along both the first and the second radial bearing section.

This allows for a relatively simple construction, a stiffer rotor body, thus with better dynamic behaviour. Furthermore, the bearing sleeve can be made thinner than when two separate, distanced rotor plugs are present.

In embodiments, a bearing sleeve is manufactured by coating the rotor plug, or part of the rotor plug. In this way, a very thin bearing sleeve can be manufactured. The coating can be a hard material with good tribological properties, such as hard chromium or tungsten carbide, or diamond-like carbon (DLC).

In embodiments, the rotor plug is combined with the rotor end piece, that is, the rotor plug and rotor end piece are manufactured as a single part and of the same material. this can be a ceramic-type material. A bearing sleeve arranged on such a rotor plug can be manufactured by coating the rotor plug, as described above.

In embodiments, the bearing sleeve is a proximal sleeve extending along the first radial bearing section and not along the second radial bearing section, and a further or distal sleeve (28*b*) extends along the second radial bearing section and not along the first radial bearing section.

This reduces the total weight of the rotor body. The sleeves can be pressed on the rotor plug from opposite sides, making the rotor body easier to assemble.

In embodiments, the distal sleeve extends over a distal end of the rotor plug, and the permanent magnet is arranged in the distal sleeve.

This implements a simple attachment and support of the permanent magnet, without additional parts, for the embodiments with two separate sleeves.

In embodiments, the bearing sleeve extends over a distal end of the rotor plug, and the permanent magnet is arranged in the bearing sleeve.

This implements a simple attachment and support of the permanent magnet, without additional parts, for the embodiments with a single bearing sleeve.

In embodiments, the permanent magnet is arranged in a magnet sleeve, the magnet sleeve extending over the permanent magnet and forming a press fit with a distal rotor plug end.

This implements a simple attachment and support of the permanent magnet, with an additional part, both for the embodiments with a single rotor plug or with two or more separate rotor plugs. This allows to manufacture the magnet sleeve from a material different from that of the bearing sleeve, and/or the magnet sleeve can be manufactured easily to have a different diameter and/or thickness than the bearing sleeve or distal sleeve. Furthermore, the press fit in the radial bearing sections is not affected by the connection to the permanent magnet, and/or the bearing sleeve can be distanced from the permanent magnet, reducing its influence on the magnetic field. In embodiments, the magnet sleeve is made of a non-magnetic material. In embodiments, the magnet sleeve is made of a magnetic material, that is, with a magnetic permeability larger than one, it is made relatively thin, in order not to compromise the magnetic field of the permanent magnet. For example, a thickness of the magnet sleeve is lower than 5% of the diameter of the magnet.

In embodiments, at least one rotor plug is, at least at one rotor plug end and in particular at both ends, tapered, wherein, when seen along the rotor's axis of rotation, a tapered section is defined as a section along which the plug is tapered, thereby gradually reducing press-fit forces between the rotor plug and the sleeve in the tapered section, in particular wherein the tapered section does not overlap the bearing section.

This allows to avoid excessive stresses in the bearing sleeve and the rotor plugs at the ends of the rotor plugs pressed into the bearing sleeve.

In embodiments, the tapered section is only tapered to a limited extent, and the force of the press fit is such that the press-fit between the rotor plug or plugs and the bearing sleeve is present along the entire axial length of at least the radial bearing.

In embodiments, the tapered section, has a length, in the axial direction, of less than a tenth of the length of the rotor plug, or less than five millimetres. A maximal reduction of the plug's radius, at the respective end of the rotor plug, can be less than one thousandth of the plug's diameter, or less than ten micrometres.

In embodiments, the permanent magnet is arranged between the first and second rotor plug.

This allows to arrange the electro-magnetic elements of the electrical machine, seen in the axial direction, between the radial bearing sections, shortening the construction of the rotor and the machine.

In embodiments, the rotor includes:

a rotor body including the at least one rotor side radial bearing, a rotor end piece including the rotor side axial bearing, wherein the rotor end piece and the rotor body are parts that are manufactured separately and are connected to one another, in particular by a press-fit, more in particular wherein the rotor end piece radially surrounds the rotor body at the interface of these two parts.

Thus, in this embodiment, the rotor body und rotor end piece are separately manufactured parts and are assembled when manufacturing the rotor.

In embodiments the rotor end piece is connected to the rotor plug and the bearing sleeve is connected to the rotor plug, both connections in particular being press-fits.

In embodiments the rotor end piece is connected to a single rotor plug and the bearing sleeve is connected to the single plug, both connections in particular being press-fits.

In embodiments, the rotor end piece includes a hollow section that can act as a press fit compensating volume and receive gas displaced when establishing the press fit. This can eliminate the problem of compressed gas forcing the press fit apart. Furthermore, it can render the outer rotor part more elastic and improve the press fit of outer rotor part and rotor plug. Furthermore, the overhanging rotor end piece being hollow reduces its weight, improving the dynamic behaviour of the rotor and stability of the bearings.

In embodiments, the rotor end piece includes a hollow section, the hollow section extending in the axial direction along at least the axial bearing section and in particular along at least 50% or 70% of the length of the rotor end piece in the axial direction, and in particular wherein either the hollow section includes or constitutes a ventilating duct establishing a fluid connection to a surrounding of the rotor, in particular wherein the ventilating duct is an axially extending through hole, or the hollow section includes or constitutes a press fit compensation volume and is enclosed in a gas-tight manner.

In embodiments, an inner diameter of the hollow section is 10% to 60% of the diameter of an axial stub or rotor stub shaft. The rotor stub shaft typically is designed to carry a part driven by or driving the rotor.

In embodiments, in regions of the rotor end piece other than the axial bearing section, a wall thickness of the rotor end piece where the hollow section is present is at minimum 50% of the radius of the rotor end piece at the same axial location.

If the hollow section and/or the press fit compensation volume includes or constitutes a ventilating duct, then in addition to eliminating the compression of gas mentioned above, it also eliminates the presence of a gas pocket that can slowly leak and contaminate process gas.

If the press fit compensation volume is enclosed in a gas-tight manner, this has the advantage of keeping solid material such as particles or dust that might appear during manufacturing or in the process gas from entering into the rotor and resulting in unwanted wear or unbalance, or unwanted contamination of the process gas during operation. In embodiments, the central bore constituting the hollow section and/or the press fit compensating volume is machined to be closed at the end opposite the press fit with the rotor plug. In other embodiments, it is manufactured as a through hole and closed with a cap or plug element. Such a plug can also be used to fill the central bore to a large extent, compensating a deformation of the rotor end piece by the plug in the rotor body.

According to an aspect of the invention that can be implemented in combination with the above-described features, or independent of them, a rotor with the following features is provided:

A rotor for a high-speed electrical machine with gas bearings, in particular according to one of the preceding claims, the rotor including at least one rotor side radial bearing, a rotor side axial bearing, at least one rotor side radial bearing, wherein, when seen along the rotor's axis of rotation, a radial bearing section is defined as a section along which a radial bearing extends, wherein when seen along the rotor's axis of rotation, an axial bearing section is a section including the rotor side axial bearing, and wherein a circumferential groove is arranged between the axial bearing section and its nearest radial bearing section.

This creates a thermal barrier between the axial bearing or thrust bearing, which heats up due to windage losses, and the radial bearings which also are sensitive to temperature changes. A further advantage is that the circumferential groove can reduce deformation of the thrust bearing area in the axial bearing section due to stresses resulting from the press fit in the radial bearing section.

In embodiments, in a radial depth of the circumferential groove is at least 10%, in particular at least 20%, in particular at least 30% of the radius of the bearing sleeve in the nearest radial bearing section.

According to an aspect of the invention, a stator bushing is provided, forming a non-rotating part of the gas bearing.

According to a first embodiment, the stator bushing is for use in a stator of a high-speed electrical machine with air bearings, the stator bushing including at least one sleeve, in the form of a hollow cylinder, and including at least one stator side radial bearing, and a stator side axial bearing plate, in the form of an annular plate, wherein a flange is attached to the sleeve, the flange including an alignment surface radially extending, that is, in directions normal to the axis of rotation, for aligning the stator side axial bearing plate with the sleeve.

According to a second embodiment, in a stator bushing of the first embodiment the flange is made of a metal-type material.

According to a third embodiment, in a stator bushing of the first or second embodiment the sleeve is made of a ceramic-type material.

According to a fourth embodiment, in a stator bushing of the first, second or third embodiment the stator side axial bearing plate is made of a metal material.

According to a fifth embodiment, the stator bushing is for use in a stator of a high-speed electrical machine with air bearings, the stator bushing including at least one sleeve, in the form of a hollow cylinder, and including at least one stator side radial bearing, and a stator side axial bearing plate, in the form of an annular plate, wherein the stator side axial bearing plate and the sleeve are separately manufactured and bonded to one another.

In embodiments, bonding can be, for example, gluing, welding, soldering.

According to a sixth embodiment, in a stator bushing of fifth embodiment the flange is made of a metal-type material.

According to a seventh embodiment, in a stator bushing of the fifth or sixth embodiment the stator side axial bearing plate is made of a metal material.

According to an eight embodiment, the stator bushing is for use in a stator of a high-speed electrical machine with air bearings, the stator bushing including at least one sleeve, in the form of a hollow cylinder, and including at least one stator side radial bearing, wherein the sleeve includes an inner sleeve and an outer sleeve, made of different materials, i.e., the inner sleeve is made out of an inner sleeve type material and an outer sleeve type material.

In embodiments, the inner sleeve type material has the following properties:

it is a metal-type material or second type material, as defined herein.

In embodiments, the outer sleeve type material has the following properties:

low CTE: lower than 7E-6 K^-1, in particular lower than 5E-6 K^-1, even more in particular lower than 4E-6 K^-1.

Typical materials of the outer sleeve type are: Ceramic materials, more specifically SiN, SiC, AlO. Other alternatives: iron-nickel alloys (such as Invar), glass-ceramics, tungsten carbide, carbide metals According to a ninth embodiment, in a stator bushing of the eight embodiment the outer sleeve includes a flange integrally shaped with the outer sleeve.

In embodiments, a fifth set of material features is present, including the features that the material of the sleeve has a CTE lower than 7E-6 K^-1, in particular lower than 5E-6 K^-1 even more in particular lower than 4E-6 K^-1, and the flange is made of a metal, in particular a steel.

In embodiments, a sixth set of material features is present, which includes the fifth set of material features and further includes the feature that the sleeve has a HK5 or Vickers hardness larger than 10 GPa, in particular larger than 15 GPa, even more in particular larger than 20 GPa, In embodiments, a seventh set of material features is present, which includes the sixth set of material features and further includes the feature that the stator side axial bearing plate is made of metal, in particular a steel.

According to embodiments, an order of priorities of the abovementioned material properties defining the sleeve, the flange and the stator side axial bearing plate is:

first priority: CTE of the sleeve and material of the flange;

second priority: Vickers Hardness of the sleeve;

third priority: material of the stator side axial bearing plate.

Further embodiments are evident from the dependent patent claims.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the figures.

Figure 1:
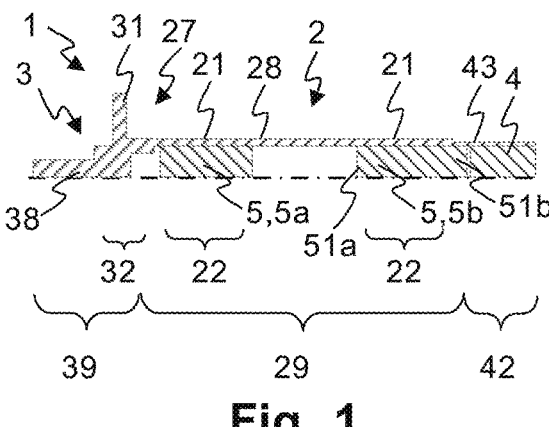
FIG. 1-2 rotors with two separate rotor plugs.

FIG. 1 schematically shows a rotor 1, with a rotor body 2 and a rotor end piece 3. The rotor body 2 has two rotor side radial bearings 21. The rotor end piece 3 includes a rotor side thrust bearing plate or rotor side axial bearing 31. When seen along the rotor's axis of rotation, for each rotor side radial bearing 21 a corresponding radial bearing section 22 is defined as a section along which the radial bearing 21 extends. This is the section in which the gas bearing generates radial forces. Usually, the radial bearing section has an at least approximately constant radial bearing gap. Likewise, an axial bearing section 32 is defined as section along which the rotor side axial bearing 31 extends. The rotor end piece 3 includes an axial stub or rotor stub shaft 38 for carrying a part driven by or driving the rotor 1, for example an impeller, turbine, beam chopper, rotating prism, etc.

The rotor end piece 3 with the rotor stub shaft 38 and rotor side axial bearing 31 are arranged at a first or proximal end of the rotor body 2. At its opposite second or distal end, a permanent magnet 4 is joined to the rotor body 2. When seen along the rotor's axis of rotation, a rotor body section 29, a rotor end section 39 and a magnet section 42 are defined as sections along which the rotor body 2, rotor end piece 3 and permanent magnet 4 extend, respectively.

A bearing sleeve 28 is integrally shaped with the rotor end piece 3. Together they form an outer rotor part 27. The bearing sleeve 28 is a hollow cylinder, and one or more rotor plugs 5 are arranged inside of and concentrically with the bearing sleeve 28. The rotor side radial bearings 21 can be implemented by the bearing sleeve 28 having a slightly larger diameter in the region of the rotor side radial bearings 21, but in other embodiments, as shown in FIG. 1, the bearing sleeve 28 can have the same diameter along the rotor side radial bearings 21 and a section between them.

The rotor plugs 5 are seated in the bearing sleeve 28 by a press fit. A press fit is also called interference fit, shrink fit, or similar. The bearing sleeve 28 being relatively thin, and held with a pre-tension against the rotor plug 5, the thermal expansion of the bearing sleeve 28 adapts to the expansion of the rotor plug 5. This allows to manufacture the bearing sleeve 28 of a metal-type material being easier to machine and being suited for the rotor side radial bearings 21, but having a relatively high CTE (coefficient of thermal expansion) that is not suited for the rotor side radial bearings 21 if this CTE was effective and not lowered by the combination with the plug(s) under the pre-tension. The rotor plug 5 is manufactured of a ceramic-type of material, having a relatively low CTE, or even zero or negative CTE. As a result, the combination of the two materials results in the rotor body 2 as a whole, and in particular the radial bearing sections 22, having a relatively low CTE in the radial direction.

A permanent magnet 4 is attached to a distal rotor plug end 51b of the rotor plug 5 by means of a concentric magnet sleeve 43 extending along the permanent magnet 4 and a connecting stub of the distal rotor plug end 51b. The rotor plug 5 has a proximal rotor plug end 51a. If two rotor plugs 5 are present, each of them has a proximal rotor plug end 51a and distal rotor plug end 51b.

For clarity, not all reference numbers shown in FIG. 1 shall be repeated in the following figures.

For a further differentiation of the elements, the two separate rotor plugs 5 are labelled as first rotor plug 5a and second rotor plug 5b. Each plug corresponds to one, two or more rotor side radial bearings 21, which in turn correspond to radial bearing sections 22, labelled as first radial bearing section 22a and second radial bearing section 22b, as shown in FIG. 2.

Figure 2:
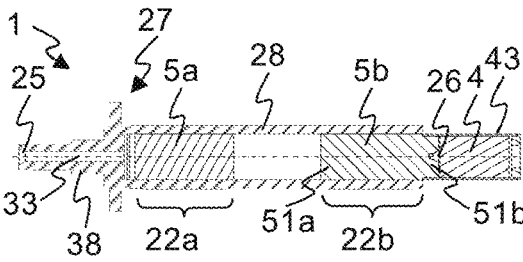

FIG. 2 shows variations to the design of the rotor 1: the rotor end piece 3 includes a central bore 33. It can serve as a ventilating duct when pressing a rotor plug 5 into the bearing sleeve 28. By reducing the weight of the overhanging rotor end piece 3, the central bore 33 can also improve the dynamic properties of the rotor 1. At an outer end of the bore, a first centring seat 25 can be arranged, with a second centring seat 26 at the distal rotor plug end 51b of the second rotor plug. Using these centring seats, the rotor stub shaft 38, rotor side axial bearing 31 and rotor side radial bearings 21 can be assembled to form a partial assembly and can be machined together, which is advantageous for the machining quality of the rotor 1.

In other embodiments, not shown, the central bore 33 is closed by an impeller 7, or another element driven by the rotor 1, or an end cap which can be a separate element or machined in one piece with the outer rotor part 27, covering the end of the central bore 33 in a gas-tight manner. This prevents solid material or gas from entering into or escaping from the central bore 33. The diameter of the rotor stub shaft 38 varies, when seen along the axial direction, e.g. by a step-wise change in the outer and inner diameter.

Figure 3:
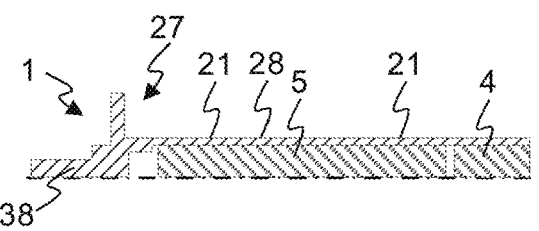
FIG. 3-4 rotors with single rotor plugs.

FIG. 3 shows a rotor 1 in which the bearing sleeve 28 extends to support the permanent magnet 4, thereby replacing the magnet sleeve 43 of the previous embodiments. Furthermore, a single rotor plug 5 is present, extending along both rotor side radial bearings 21. Such as single rotor plug 5 can also be implemented in combination with a magnet sleeve 43.

Figure 4:
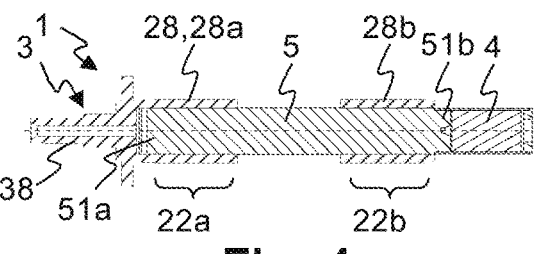

FIG. 4 shows a rotor 1 with a single rotor plug 5 and with the bearing sleeve 28 split into a proximal sleeve 28a and a distal sleeve 28b. These two sleeves are pressed on the two ends of the rotor plug 5. The proximal sleeve 28a can be integrally shaped with the rotor end piece 3. The distal sleeve 28b can be integrally shaped with a sleeve supporting the permanent magnet 4, or, as shown, a magnet sleeve 43 as already introduced can be present.

Figure 5:
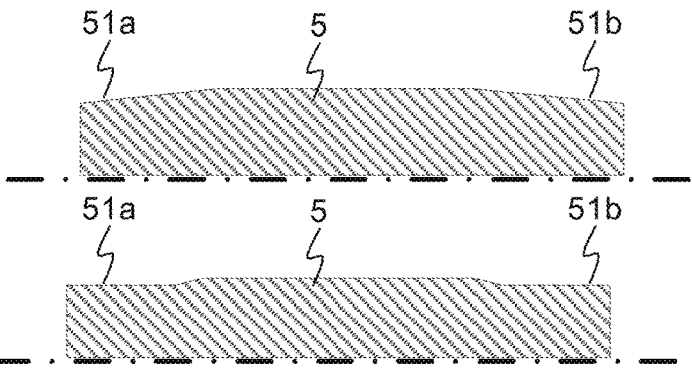
FIG. 5 tapered ends of rotor plugs in an exaggerated manner.

FIG. 5 shows rotor plugs 5 with a tapered section at each rotor plug end 51a, 51b. The tapered section in the top figure has a continually decreasing diameter, the one in the bottom figure has a diameter that first decreases continually in a first section and then remains constant in a second section, seen in the direction of the axis of rotation. The degree to which the rotor plug 5 is tapered is relatively small, and is highly exaggerated in the Figures. For example, the tapered section can extend along two millimetres in the direction of the axis of rotation, and lead to a maximal reduction of the plug's radius, at the respective end of the rotor plug 5, of four micrometres. The taper leads to a gradual decrease in the internal stresses in the bearing sleeve 28 and avoids excessive stresses where it is near at the respective end of the rotor plug 5.

Figure 6:
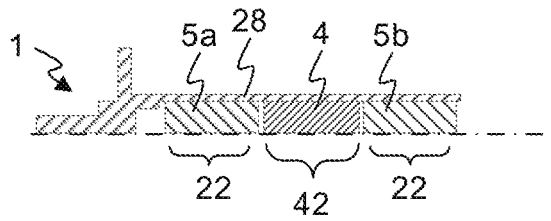
FIG. 6 a rotor with a permanent magnet between two rotor plugs.

FIG. 6 shows the permanent magnet 4 arranged inside the bearing sleeve 28, in between two separate rotor plugs 5, and thus also between the rotor side radial bearings 21. This leads to a shorter construction of the rotor 1.

Figure 7:
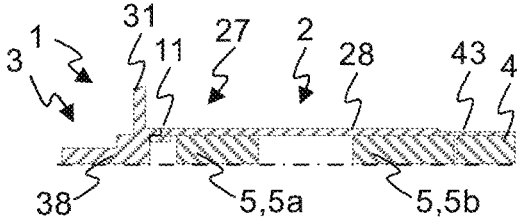
FIG. 7 a rotor with a rotor end piece joined to a rotor body.

FIG. 7 shows an embodiment in which the outer rotor part 27 is manufactured of separate parts, these being the bearing sleeve 28 and the rotor stub shaft 38 with the rotor side axial bearing 31. The bearing sleeve 28 and the rotor plug or plugs 5 constitute the rotor body 2, and the rotor stub shaft 38 and the rotor side axial bearing 31 constitute the rotor end piece 3. The rotor body 2 and rotor end piece 3 are connected, in particular by a press-fit, in particular by the rotor end piece 3 radially surrounding the rotor body 2 at the interface of these two parts. Both the rotor end piece 3 and the bearing sleeve 28 can be made of a metal-type material, making them easier to machine than the rotor plugs 5. In alternative embodiment, not illustrated, the rotor body 2 radially surrounds the rotor end piece 3 at the interface of these two parts.

Figure 8:
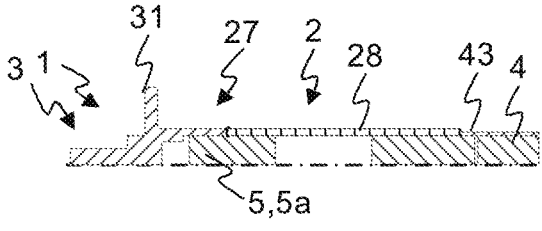
FIG. 8-10 further variants of rotors.

FIG. 8 corresponds to the embodiment of FIG. 2, but with a split bearing sleeve 28. The rotor end piece 3 is connected to the rotor plug 5a by a proximal section of the split bearing sleeve 28, and a distal section of the split bearing sleeve 28 being connected to the rotor plug 5a, both connections in particular being press-fits.

Figure 9:
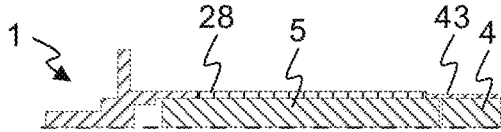

FIG. 9 corresponds to the embodiment of FIG. 8, but with one rotor plug instead of two rotor plugs.

Figure 10:
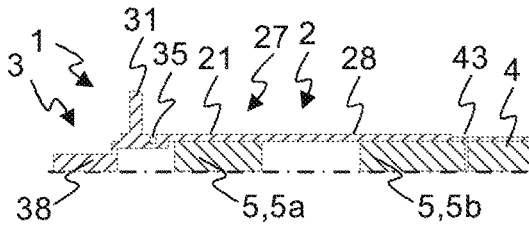

FIG. 10 shows an embodiment with a circumferential groove 35 between the rotor end piece 3 (with the rotor stub shaft 38 and rotor side axial bearing 31) and the bearing sleeve 28. The circumferential groove 35 can thermally and/or mechanically decouple the rotor end piece 3 and bearing sleeve 28 from one another.

In embodiments, at least part of the outer rotor part 27, in particular a bearing sleeve 28, is manufactured by coating the rotor plug 5 or part of the rotor plug 5. The coating can be, for example, hard chromium or tungsten carbide, or diamond-like carbon (DLC). This allows to create a very thin bearing sleeve 28. Its thermal expansion is dominated by that of the bearing plug 5.

Such a coating constituting a bearing sleeve can be present in, for example, the embodiments of FIG. 4 (as distal sleeve 28b) or FIG. 9 (as bearing sleeve 28), FIGS. 11-15 show embodiments of stator bushings 100 including a sleeve 101 and a flange 102 for aligning a stator side axial bearing plate 131 with the sleeve 101.

Figure 11:
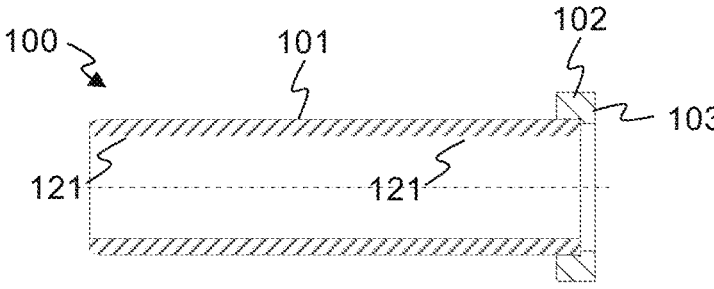
FIG. 11-14 embodiments of stator bushings with a flange.

FIG. 11 shows a stator bushing 100 including a sleeve 101, the sleeve being substantially cylindrical, and an annular stator flange 102, the flange 102 in turn including an alignment surface 103. The stator bushing 100 is designed to serve as bearing bushing for a rotor 1 with journal bearings, of the kind presented herein but not limited thereto. The sleeve 101 constitutes, on an inner cylindrical surface, a stator side radial bearing or bearings 121. The alignment surface 103 is normal to an axis of rotation, which axis coincides with a longitudinal axis of the stator bushing 100. The alignment surface 103 serves to align a stator side axial bearing plate 131 (not shown in FIG. 10) with the sleeve 101. This stator side axial bearing plate 131 together with a second stator side axial bearing plate, forms a thrust bearing in which the rotor's axial bearing plate turns. By manufacturing the flange 102 as a part separate from the stator bushing 100 and then joining them to one another it is possible to manufacture each of them as a part that is simple to machine, and/or they can be made of different materials. Joining of the sleeve 101 and the flange 102 can be done by press fit, gluing, welding, or soldering.

The stator side axial bearing plate 131 aligned with the sleeve 101 in this manner can be used in a bearing arrangement as in WO 2017/202941 A1, which is herewith incorporated by reference.

Figure 12:
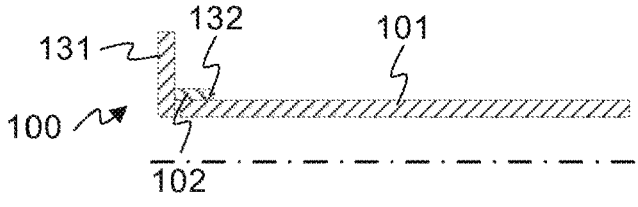

FIG. 12 shows the flange 102 being of a substantially cylindrical shape, coaxially arranged with and attached in a fixed manner to the sleeve 101. The flange 102 is pressed against the axial bearing plate 131 by an axial compensation element 132 in the manner disclosed in WO 2017/202941 A1. The axial compensation element 132 can be a plate spring (conical spring washer) or spring washer or an O-ring. It is arranged to press the bushing sleeve 101, by exerting an axial force against its flange 102, in the axial direction away from a stator body (not shown) against the axial bearing plate 131 or stator disc. The axial bearing plate 131 or stator disc in turn is pressed and held against the stator body by a fastener (not shown).

Figure 13:
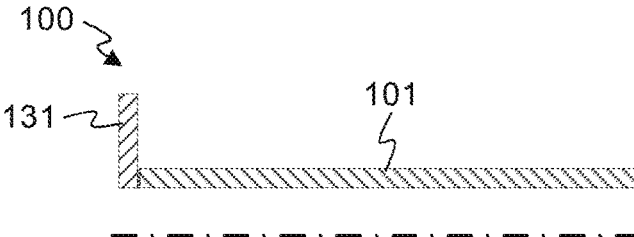

FIG. 13 shows an axial bearing plate 131 attached to a sleeve 101 in a fixed manner, for example, by gluing, welding, soldering.

Figure 14:
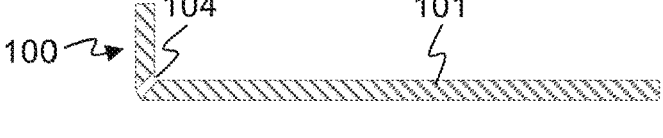

FIG. 14 shows an axial bearing plate 131 attached to a sleeve 101 in a fixed manner, and with one or more ventilating openings 104 passing through the axial bearing plate 131 and/or the sleeve 101 in a region where they are joined to one another.

Figure 15:
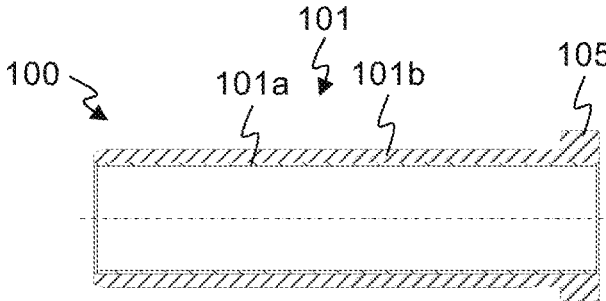
FIG. 15 a stator bushing made of concentric sleeves.

FIG. 15 shows the sleeve 101 including an inner sleeve 101a and an outer sleeve 101b coaxially arranged. They can be assembled with a press fit or another means of connection, such as for example, gluing, welding, soldering. In his way, they can be made of separate materials. Furthermore, the outer sleeve 101b includes an integrally shaped flange 105. In this manner, the outer sleeve 101b can be chosen to be thicker than the inner sleeve 101a, thereby dominating the total CTE resulting from the combination of the two materials. This is the same principle as in the rotor embodiments in which the CTE of the rotor plug 5 combined with the bearing sleeve 28 dominates the total CTE of the rotor body 2. The material of the inner sleeve 101a can be chosen according to requirements on the radial bearing or bearings 121.

While the invention has been described in present embodiments, it is distinctly understood that the invention is not limited thereto, but may be otherwise variously embodied and practised within the scope of the claims.

The invention claimed is:

1. A rotor for a high-speed electrical machine with gas bearings, the rotor comprising:
   at least one rotor side radial bearing,
   a rotor side axial bearing,
   a rotor body section comprising the at least one rotor side radial bearing,
   a rotor end section comprising the rotor side axial bearing,
   wherein, when seen along an axis of rotation of the rotor, a radial bearing section is defined as a section along which a radial bearing extends,
   wherein
   an outer rotor part extends along the rotor end section and the rotor body section,
   the outer rotor part is shaped to form, in the rotor body section, a hollow cylinder serving as a bearing sleeve comprising the at least one rotor side radial bearing,
   wherein the outer rotor part in the rotor end section forms a rotor stub shaft, and the rotor stub shaft carries a part driven by or driving the rotor, and
   at least one rotor plug is arranged inside the bearing sleeve, and the material of the at least one rotor plug has a coefficient of thermal expansion (CTE) lower than $7E\text{-}6\ K^{\wedge}1$.

2. The rotor of claim 1, wherein the outer rotor part material is at least one of a metal or a metal-type material or a steel.

3. The rotor of claim 1, wherein the material of the outer rotor part has a Rockwell hardness larger than 40 HRC.

4. The rotor of claim 1, wherein the material of the at least one rotor plug has a density lower than $4500\ kg/m^{\wedge}3$.

5. The rotor of claim 1, wherein in at least one of one or more radial bearing sections the at least one rotor plug extends along all of the radial bearing section.

6. The rotor of claim 1, wherein the rotor comprises a first and a second rotor side radial bearing, corresponding, respectively, to a first and a second radial bearing section, and wherein a first and second rotor plug are arranged, respectively, to extend along the first and second radial bearing section.

7. The rotor of claim 1, wherein the rotor comprises a first and a second rotor side radial bearing, corresponding, respectively, to a first and a second radial bearing section, and wherein a single rotor plug is arranged to extend along both the first and the second radial bearing section.

8. The rotor of claim 7, wherein the bearing sleeve is a proximal sleeve extending along the first radial bearing section and not along the second radial bearing section, and a further or distal sleeve extends along the second radial bearing section and not along the first radial bearing section.

9. The rotor of claim 8, wherein the distal sleeve extends over a distal end of the rotor plug, and a permanent magnet is arranged in the distal sleeve.

10. The rotor of claim 1, wherein the bearing sleeve extends over a distal end of the rotor plug, and a permanent magnet is arranged in the bearing sleeve.

11. The rotor of claim 1, with a permanent magnet being arranged in a magnet sleeve, the magnet sleeve extending over the permanent magnet and forming a press fit with a distal rotor plug end.

12. The rotor of claim 1, with at least one rotor plug being, at one rotor plug end or at both ends, tapered,
    wherein, when seen along the axis of rotation of the rotor, a tapered section is defined as a section along which the plug is tapered,
    thereby gradually reducing press-fit forces between the rotor plug and the bearing sleeve in the tapered section,
    wherein the tapered section does not overlap the radial bearing section.

13. The rotor of claim 1, wherein a permanent magnet is arranged between a first and a second rotor plug.

14. The rotor of claim 1, comprising,
    a rotor body comprising the at least one rotor side radial bearing,
    a rotor end piece comprising the rotor side axial bearing,
    wherein the rotor end piece and the rotor body are parts that are manufactured separately and are connected to one another.

15. The rotor of claim 1, wherein a rotor end piece comprises a hollow section, the hollow section extending in the axial direction along at least an axial bearing section and along at least 50% of the length of the rotor end piece in the axial direction,
    and wherein
        either the hollow section comprises or constitutes a ventilating duct establishing a fluid connection to a surrounding of the rotor,
        or the hollow section comprises or constitutes a press fit compensation volume and is enclosed in a gas-tight manner.

16. A rotor for a high-speed electrical machine with gas bearings, according to claim 1, the rotor comprising:
    the at least one rotor side radial bearing,
    the rotor side axial bearing,
    wherein when seen along the axis of rotation of the rotor, an axial bearing section is a section comprising the rotor side axial bearing, and
    wherein a circumferential groove is arranged between the axial bearing section and its nearest radial bearing section.

17. The rotor of claim 14, wherein the rotor end piece and the rotor body are connected to one another by a press-fit.

18. The rotor of claim 14, wherein the rotor end piece radially surrounds the rotor body at the interface of these two parts.

* * * * *